United States Patent
Zhang et al.

(10) Patent No.: US 11,120,276 B1
(45) Date of Patent: Sep. 14, 2021

(54) DEEP MULTIMODAL CROSS-LAYER INTERSECTING FUSION METHOD, TERMINAL DEVICE, AND STORAGE MEDIUM

(71) Applicant: Tsinghua University, Beijing (CN)

(72) Inventors: Xinyu Zhang, Beijing (CN); Zhiwei Li, Beijing (CN); Huaping Liu, Beijing (CN); Xingang Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/325,235

(22) Filed: May 20, 2021

(30) Foreign Application Priority Data

Jul. 30, 2020 (CN) .................. 202010752038.X

(51) Int. Cl.
| | | |
|---|---|---|
| *G06T 7/10* | (2017.01) | |
| *G06K 9/00* | (2006.01) | |
| *G06K 9/62* | (2006.01) | |

(52) U.S. Cl.
CPC ....... *G06K 9/00791* (2013.01); *G06K 9/6289* (2013.01); *G06T 7/10* (2017.01);
(Continued)

(58) Field of Classification Search
CPC .. G06K 9/00791–00845; G06K 9/6289; G06T 7/10–194; G06T 2207/10024;
(Continued)

(56) References Cited

U.S. PATENT DOCUMENTS

| | | | | |
|---|---|---|---|---|
| 10,169,678 B1 * | 1/2019 | Sachdeva | ............. | G05D 1/0221 |
| 10,408,939 B1 * | 9/2019 | Kim | ....................... | G01S 13/867 |

(Continued)

FOREIGN PATENT DOCUMENTS

| | | |
|---|---|---|
| CN | 110738200 A | 1/2020 |
| CN | 110929696 A | 3/2020 |

(Continued)

OTHER PUBLICATIONS

Madawi "RGB and LiDAR fusion based 3D Semantic Segmentation for Autonomous Driving" 2019 IEEE Intelligent Transportation Systems Conference (ITSC) (Year: 2019).*

Xinyu Zhang, et al., Deep Multi-modal Fusion in Object Detection for Autonomous Driving, CAAI Transactions on Intelligent Systems, 2020, p. 758-771, vol. 15 No. 4.

(Continued)

*Primary Examiner* — Sean T Motsinger

(74) *Attorney, Agent, or Firm* — Bayramoglu Law Offices LLC

(57) ABSTRACT

A deep multimodal cross-layer intersecting fusion method, a terminal device and a storage medium are provided. The method includes: acquiring an RGB image and point cloud data containing lane lines, and pre-processing the RGB image and point cloud data; and inputting the pre-processed RGB image and point cloud data into a pre-constructed and trained semantic segmentation model, and outputting an image segmentation result. The semantic segmentation model is configured to implement cross-layer intersecting fusion of the RGB image and point cloud data. In the new method, a feature of a current layer of a current modality is fused with features of all subsequent layers of another modality, such that not only can similar or proximate features be fused, but also dissimilar or non-proximate features can be fused, thereby achieving full and comprehensive fusion of features. All fusion connections are controlled by a learnable parameter.

18 Claims, 4 Drawing Sheets

(52) U.S. Cl.
CPC ............... *G06T 2207/10024* (2013.01); *G06T 2207/10028* (2013.01); *G06T 2207/20081* (2013.01); *G06T 2207/20084* (2013.01); *G06T 2207/30252* (2013.01)

(58) Field of Classification Search
CPC . G06T 2207/10028; G06T 2207/20081; G06T 2207/20084; G06T 2207/30252
See application file for complete search history.

(56) References Cited

U.S. PATENT DOCUMENTS

| | | | | |
|---|---|---|---|---|
| 10,452,959 | B1* | 10/2019 | Gautam | G06K 9/6271 |
| 10,592,765 | B2* | 3/2020 | Fathi | G06K 9/00201 |
| 10,929,694 | B1* | 2/2021 | Zhang | G06K 9/6289 |
| 2016/0180195 | A1* | 6/2016 | Martinson | G06K 9/6202 |
| | | | | 382/103 |
| 2017/0039436 | A1* | 2/2017 | Chen | G06K 9/4628 |
| 2019/0114774 | A1* | 4/2019 | Zhang | G06N 3/04 |
| 2019/0147245 | A1* | 5/2019 | Qi | G06K 9/3233 |
| | | | | 382/103 |
| 2019/0147335 | A1* | 5/2019 | Wang | G06N 3/0454 |
| | | | | 706/20 |
| 2020/0111225 | A1* | 4/2020 | Chondro | G06T 7/11 |
| 2020/0125830 | A1* | 4/2020 | Lei | G06K 9/4652 |
| 2020/0150275 | A1* | 5/2020 | Zhu | G06T 17/05 |
| 2020/0160559 | A1* | 5/2020 | Urtasun | G06K 9/629 |
| 2020/0184718 | A1* | 6/2020 | Chiu | G06T 7/33 |
| 2020/0355820 | A1* | 11/2020 | Zeng | G01S 13/931 |
| 2020/0394813 | A1* | 12/2020 | Theverapperuma | E02F 3/437 |
| 2020/0402300 | A1* | 12/2020 | Ding | G06T 17/05 |
| 2021/0030199 | A1* | 2/2021 | Olson | G06T 7/70 |
| 2021/0118166 | A1* | 4/2021 | Tremblay | B25J 9/1697 |

FOREIGN PATENT DOCUMENTS

| | | |
|---|---|---|
| CN | 111242015 A | 6/2020 |
| CN | 111274976 A | 6/2020 |
| CN | 111291676 A | 6/2020 |
| CN | 111339830 A | 6/2020 |

OTHER PUBLICATIONS

Bin Yu, et al., Deep Learning Based Point Cloud Segmentation: A Survey, Computer Engineering and Applications, 2020, pp. 38-45, 56(1).

Lifeng An, et al., Semantic segmentation-aided visual odometry for urban autonomous driving, International Journal of Advanced Robotic Systems, 2017, pp. 1-11.

Rafael Barea, et al., Vehicle Detection and Localization using 3D LIDAR Point Cloud and Image Semantic Segmentation, 21st International Conference on Intelligent Transportation Systems (ITSC), 2018, pp. 3481-3486.

* cited by examiner

DEEP MULTIMODAL CROSS-LAYER INTERSECTING FUSION METHOD, TERMINAL DEVICE, AND STORAGE MEDIUM

CROSS REFERENCE TO THE RELATED APPLICATIONS

This application is based upon and claims priority to Chinese Patent Application No. 202010752038.X, filed on Jul. 30, 2020, the entire contents of which are incorporated herein by reference.

TECHNICAL FIELD

The present invention relates to the field of unmanned driving technology, in particular to a deep multimodal cross-layer intersecting fusion method, a terminal device, and a storage medium.

BACKGROUND

In recent years, unmanned driving technology has developed rapidly, in which an automobile relies on various sensors to sense the surrounding environment. This involves fusion of multi-sensor data, also known as multimodal fusion. With the fusion of multimodal data, more accurate and reliable information can be provided for the automobile, and driving safety and robustness are improved.

Effective acquisition of unimodal data is difficult to guarantee under the all-weather and all-scene condition, resulting in a great challenge for stable and reliable operation of an automatic driving algorithm based on unimodal data. However, unmanned driving requires high safety. Automatic driving technology based on multimodal data fusion can achieve mutual complementation of advantages of different types of sensors, and thus is widely used in the field of automatic driving. Currently, there has been some research on multimodal data fusion methods at home and abroad, which mainly fall into four fusion modes: early-fusion, intermediate fusion, late-fusion and intersecting fusion. However, these modes have some problems. In early fusion, raw data of multiple modalities is fused directly without considering the difference of feature representation spaces in which the data of different modalities is located. In intermediate fusion, data of multiple modalities is fused at an intermediate feature layer, and the fused features are not necessarily in one feature representation space. Late-fusion is performed directly at a decision level, i.e., final results of multiple modalities are fused directly without considering interactive fusion between features in various layers. Intersecting fusion is a combination of the early-fusion, intermediate fusion, and late-fusion modes, but it still cannot ensure features fused at corresponding layers be in a same feature space. The significance of fusion lies in dealing with the difference and complementarity between data of different modalities, and the influence of multimodal data fusion on a final sensing result falls into two types: fusion enhancement and fusion suppression. However, there is still no mature theoretical explanation and support on whether fusion should be performed at the time when the difference between data features in two different modalities is large or small in order to achieve a fusion enhancement effect. Moreover, how to fuse multimodal data and the choice of fusion timing have not yet been clearly addressed.

SUMMARY

An objective of the present invention is to overcome the above technical shortcomings and provide a deep multimodal cross-layer intersecting fusion method, which is more flexible, takes full account of whether features to be fused are in one feature representation space, and transforms fusion of features into learning of neural network parameters to enable a network to learn the fusion method itself, so that the existing early-fusion, intermediate fusion, late-fusion, and intersecting fusion may be regarded as special cases of cross-layer intersecting fusion.

To achieve the above objective, Embodiment 1 of the present invention provides a deep multimodal cross-layer intersecting fusion method, the method including:

acquiring an RGB image and point cloud data containing lane lines, and pre-processing the same; and inputting the pre-processed RGB image and point cloud data into a pre-constructed and trained semantic segmentation model, and outputting an image segmentation result, the semantic segmentation model being configured to implement cross-layer intersecting fusion of the RGB image and point cloud data.

As an improvement of the above-mentioned method, the RGB image is obtained by a forward-facing monocular photographic camera or forward-facing monocular camera mounted on a traveling vehicle; the RGB image contains road image information directly in front of the traveling vehicle in a driving direction thereof and above a road surface; the point cloud data is obtained by a lidar mounted on the traveling vehicle, a point cloud containing road point cloud information directly in front of the traveling vehicle in the driving direction thereof and above the road surface, and its viewing angle range may be processed to be aligned with the camera image; and the RGB image and the point cloud data are collected synchronously.

As an improvement of the above-mentioned method, the semantic segmentation model is a SkipCrossNet model composed of a point cloud branch and an image branch, and the model is divided into three fusion units:

a first fusion unit configured for intersecting fusion of the point cloud data and the RGB image;

a second fusion unit configured for fusion of features in a point cloud Encoder stage and features in an image Encoder stage; and a third fusion unit configured for fusion of features in a point cloud Decoder stage and features in an image Decoder stage.

As an improvement of the above-mentioned method, a specific implementation process of the first fusion unit is as follows:

image to point cloud fusion:

$$Lidar_f = R_0 * RGB + Lidar$$

where Lidar is the acquired point cloud data, RGB is the acquired RGB image, $Lidar_f$ is point cloud data after fusion, and $R_0$ is a fusion parameter; and point cloud to image fusion:

$$RGB_f = L_0 * Lidar + RGB$$

where $RGB_f$ is an image after fusion, and $L_0$ is a fusion parameter; and $Lidar_f$ and $RGB_f$ are output to the second fusion unit.

As an improvement of the above-mentioned method, the second fusion unit includes N fusion stages; an input to a first fusion stage is: $Lidar_f$ and $RGB_f$ output by first fusion subunits; an input to an $i^{th}$ fusion stage is an output from an $(i-1)^{th}$ fusion stage; an output from an $N^{th}$ fusion stage is an input to the third fusion unit; the number of fusions of each fusion stage is preset; and if the number of fusions in a fusion stage is M, a specific implementation process of the fusion stage is as follows:

for the point cloud branch, a first-layer feature of a Lidar Block is fused with a first-layer feature of an RGB Block:

$$\text{Lidar\_L}_E\text{\_Feature}_2 = S_{11} * \text{RGB\_L}_E\text{\_feature}_1 + \text{Lidar\_L}_E\text{\_feature}_1$$

where Lidar_$L_E$_Feature$_2$ represents a second-layer feature of the Lidar Block, Lidar_$L_D$_feature$_1$ represents the first-layer feature of the Lidar Block, i.e. a point cloud feature input to the fusion stage; RGB_$L_D$_feature$_1$ represents the first-layer feature of the RGB Block, i.e. an image feature input to the fusion stage; and $S_{11}$ represents a fusion parameter of the first-layer feature of the RGB Block to the first-layer feature of the Lidar Block;

when 2≤m≤M−1, an $m^{th}$-layer feature of the Lidar Block is fused with all features of the first m layers of the RGB Block to obtain an $(m+1)^{th}$-layer feature Lidar_$L_E$_Feature$_m$ of the Lidar Block:

$$\text{Lidar\_L}_E\text{\_Feature}_{m+1} = \sum_{k=1}^{m} S_{k,m} * \text{RGB\_L}_E\text{\_Feature}_k + \text{Lidar\_L}_E\text{\_Feature}_m$$

where RGB_$L_E$_Feature$_k$ represents a $k^{th}$-layer feature of the RGB Block; $S_{k,m}$ represents a fusion parameter of the $k^{th}$-layer feature of the RGB Block to an $m^{th}$-layer feature of the Lidar Block; and Lidar_$L_E$_Feature$_m$ represents the $m^{th}$-layer feature of the Lidar Block; and for the image branch, the first-layer feature of the RGB Block is fused with the first-layer feature of the Lidar Block:

$$\text{RGB\_L}_E\text{\_Feature}_2 = T_{11} * \text{Lidar\_L}_E\text{\_feature}_1 + \text{RGB\_L}_E\text{\_feature}_1$$

where RGB_$L_E$_Feature$_2$ represents a second-layer feature of the RGB Block, and $T_{11}$ represents a fusion parameter of the first-layer feature of the Lidar Block to the first-layer feature of the RGB Block;

when 2≤m≤M−1, an $m^{th}$-layer feature of the RGB Block is fused with all features of the first m layers of the Lidar Block to obtain an $(m+1)^{th}$-layer feature RGB_$L_E$_Feature$_m$ of the RGB Block:

$$\text{RGB\_L}_E\text{\_Feature}_{m+1} = \sum_{k=1}^{m} T_{k,m} * \text{Lidar\_L}_E\text{\_Feature}_k + \text{RGB\_L}_E\text{\_Feature}_m$$

where Lidar_$L_E$_Feature$_k$ represents a $k^{th}$-layer feature of the Lidar Block; $T_{k,m}$ represents a fusion parameter of the $k^{th}$-layer feature of the Lidar Block to the $m^{th}$-layer feature of the RGB Block; and RGB_$L_E$_Feature$_m$ represents the $m^{th}$-layer feature of the RGB Block; and an output of the fusion stage is Lidar_$L_E$_Feature$_M$ and RGB_$L_E$_Feature$_M$.

As an improvement of the above-mentioned method, a specific implementation process of the third fusion unit is as follows:

a first-layer feature in the point cloud Decoder stage is fused with a first-layer feature in the image Decoder stage:

$$\text{Lidar\_L}_D\text{\_Feature}_2 = R_1 * \text{RGB\_L}_D\text{\_feature}_1 + \text{Lidar\_L}_D\text{\_feature}_1$$

where Lidar_$L_D$_Feature$_2$ represents a second-layer feature in the point cloud Decoder stage, RGB_$L_D$_feature$_1$ represents the first-layer feature in the image Decoder stage, i.e. an image feature output by the second fusion unit; Lidar_$L_D$_feature$_1$ represents the first-layer feature in the point cloud Decoder stage, i.e. a point cloud feature output by the second fusion unit; and $R_1$ represents a fusion parameter of the first-layer feature in the image Decoder stage to the first-layer feature in the point cloud Decoder stage; the first-layer feature in the image Decoder stage is fused with the first-layer feature in the point cloud Decoder stage:

$$\text{RGB\_L}_D\text{\_Feature}_2 = L_1 * \text{Lidar\_L}_D\text{\_feature}_1 + \text{RGB\_L}_D\text{\_feature}_1$$

where RGB_$L_{D1}$_Feature$_f$ represents a second-layer feature in the image Decoder stage; and $L_1$ represents a fusion parameter of the first-layer feature in the point cloud Decoder stage to the first-layer feature in the image Decoder stage;

when 2≤i≤N−1, an $i^{th}$-layer feature in the point cloud Decoder stage is fused with an $i^{th}$-layer feature in the image Decoder stage:

$$\text{Lidar\_L}_D\text{\_Feature}_{i+1} = R_1 * \text{RGB\_L}_D\text{\_feature}_i + \text{Lidar\_L}_D\text{\_feature}_1$$

where Lidar_$L_D$_Feature$_{i+1}$ represents an $(i+1)^{th}$-layer feature in the point cloud Decoder stage, RGB_$L_D$_feature$_1$ represents the $i^{th}$-layer feature in the image Decoder stage, Lidar_$L_D$_feature$_1$ represents the $i^{th}$-layer feature in the point cloud Decoder stage, and $R_1$ represents a fusion parameter of the $i^{th}$-layer feature in the image Decoder stage to the $i^{th}$-layer feature in the point cloud Decoder stage;

the $i^{th}$-layer feature in the image Decoder stage is fused with the $i^{th}$-layer feature in the point cloud Decoder stage:

$$\text{RGB\_L}_D\text{\_Feature}_{i+1} = L_1 * \text{Lidar\_L}_D\text{\_feature}_1 + \text{RGB\_L}_D\text{\_feature}_1$$

where RGB_$L_D$_Feature$_{i+1}$ represents an $(i+1)^{th}$-layer feature in the image Decoder stage; and $L_1$ represents a fusion parameter of the $i^{th}$-layer feature in the point cloud Decoder stage to the $i^{th}$-layer feature in the image Decoder stage; and an output Output of the third fusion unit is:

$$\text{Output} = L_N * \text{Lidar\_L}_D\text{\_Feature}_N + R_N \text{RGB\_L}_D\text{\_Feature}_N$$

where Lidar_$L_D$_Feature$_N$ represents an $N^{th}$-layer feature in the point cloud Decoder stage, RGB_$L_D$_Feature$_N$ represents an $N^{th}$-layer feature in the image Decoder stage, and $L_N$ and $R_N$ represent fusion parameters of the $N^{th}$ layer in the point cloud Decoder stage.

As an improvement of the above-mentioned method, the method further including: establishing a training set, and training the semantic segmentation model to obtain fusion parameters therein, values of which are all within [0, 1].

Embodiment 3 of the present invention provides a terminal device, including a memory, a processor, and a computer program stored in the memory and executable by the processor, wherein when executing the computer program, the processor executes the above-mentioned method.

Embodiment 4 of the present invention provides a storage medium, the storage medium storing a computer program which, when executed by a processor, causes the processor to execute the above-mentioned method.

The present invention has the following advantages:

1. In the method of the present invention, a feature of a current layer of a current modality is fused with features of all subsequent layers of another modality, such that not only can similar or proximate features be fused, but also dissimilar or non-proximate features can be fused, thereby achieving full and comprehensive fusion of features; and all fusion connections are controlled by a learnable parameter, which makes the fusion more flexible and intelligent without presetting and fixing a fusion mode.

2. The method of the present invention can improve the accuracy of image segmentation and other pattern recognition tasks.

DETAILED DESCRIPTION OF THE EMBODIMENTS

Technical solutions of the present application will be described clearly and completely. It should be understood that the embodiments described are only part of the embodiments of the present application, and not all the embodiments. All other embodiments obtained by those of ordinary skill in the art without creative work, based on the embodiments in the present application, fall into the protection scope of the present application.

Second, the so called "one embodiment" or "an embodiment" here refers to a specific feature, structure, or characteristic that can be included in at least one implementation of the present invention. The expressions "in an embodiment" appearing in different places in this specification do not refer to the same embodiment, nor separate or selective embodiments that are mutually exclusive with other embodiments.

Figure 1:
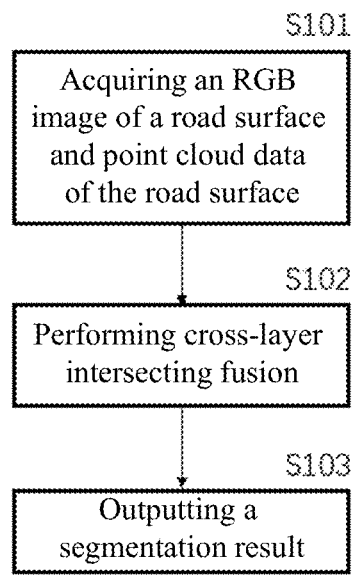
FIG. 1 is a flow diagram of a deep multimodal cross-layer intersecting fusion method provided in Embodiment 1 of the present invention.

As shown in FIG. 1, Embodiment 1 of the present invention proposes a deep multimodal cross-layer intersecting fusion method, specifically including the following steps.

S101: a monocular RGB image and point cloud data with lane lines are acquired.

A forward-facing monocular photographic camera or forward-facing monocular vehicle photographic camera mounted on a traveling vehicle is used to collect road image information. The forward-facing monocular photographic camera collects road image information road image information directly in front of the traveling vehicle in a driving direction thereof and above a road surface. That is, the collected road image information is a perspective view corresponding to collected information directly in front of the vehicle in the driving direction thereof and above the road surface.

In this example, the road image information and road point cloud information are collected synchronously. That is, after a lidar and a forward-facing monocular photographic camera are mounted and configured on the traveling vehicle, their relative position attitudes are calibrated, and at the same time road data collection is started on the same road surface.

For ease of calculation, a point cloud involved in each of the following embodiments of the invention is a part of a 3600 point cloud that is directly in front of the vehicle, i.e., in a direction where the image is located. Moreover, since the photographic camera and the Lidar are already calibrated, a conversion matrix of projecting the point cloud to a pixel plane may be determined to facilitate subsequent processing of point cloud information and image information. As a visual field of point cloud data is generally larger than that of a photographic camera image, a point cloud projected image is cropped according to a visual field range of the photographic camera image and the size of the data to obtain point cloud image data of the same size as the RGB image.

S102: a semantic segmentation model is constructed, and cross-layer intersecting fusion of the RGB image and the point cloud data is implemented.

In the expression cross-layer intersecting fusion, "cross-layer" means that a feature of a current layer in a point cloud semantic segmentation branch is fused not only with a feature of the same layer of an image branch (which is a mode adopted in early-fusion, intermediate fusion, late-fusion and intersecting fusion), but also with features of all subsequent layers of the image branch, and each fusion connection is controlled by a learnable parameter; and intersecting means that features of the point cloud branch are fused to the image branch, and features of the image branch are also fused to the point cloud branch, wherein a fusion parameter is a floating point number between [0, 1], which indicates no fusion at 0, and indicates fusion otherwise.

Figure 2:
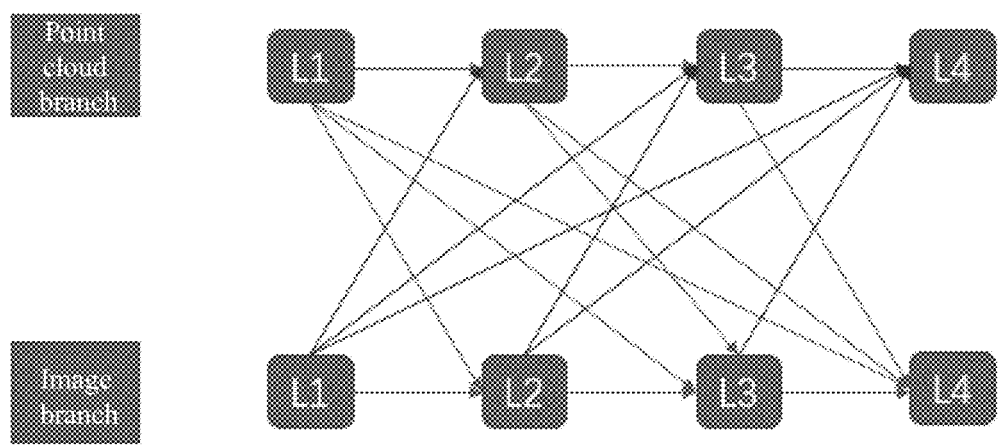
FIG. 2 is a structure diagram of a deep cross-layer intersecting fusion method provided in Embodiment 1 of the present invention.

Cross-layer intersecting fusion is performed in a neural network, and a feature of each layer of the point cloud branch is fused with features of a corresponding layer and all subsequent layers of the image branch, and correspondingly, a feature of each layer of the image branch is fused with features of a corresponding layer and all subsequent layers of the point cloud branch, as shown in FIG. 2. As a convolutional neural network extracts features, a feature pyramid is naturally formed, in which features become abstract layer by layer, and features of layers close to each other are relatively proximate or similar. Therefore, a concept of fusion stage (domain) is introduced on the basis of the above description, that is, the whole cross-layer intersecting fusion model is divided into multiple domains, and cross-layer intersecting fusion is performed in each domain, because for multiple modalities, features in a region are more proximate or similar, and the number and sizes of the domains can be adjusted, which makes the cross-layer intersecting fusion more flexible and efficient, and further improves the present invention.

Figure 3:
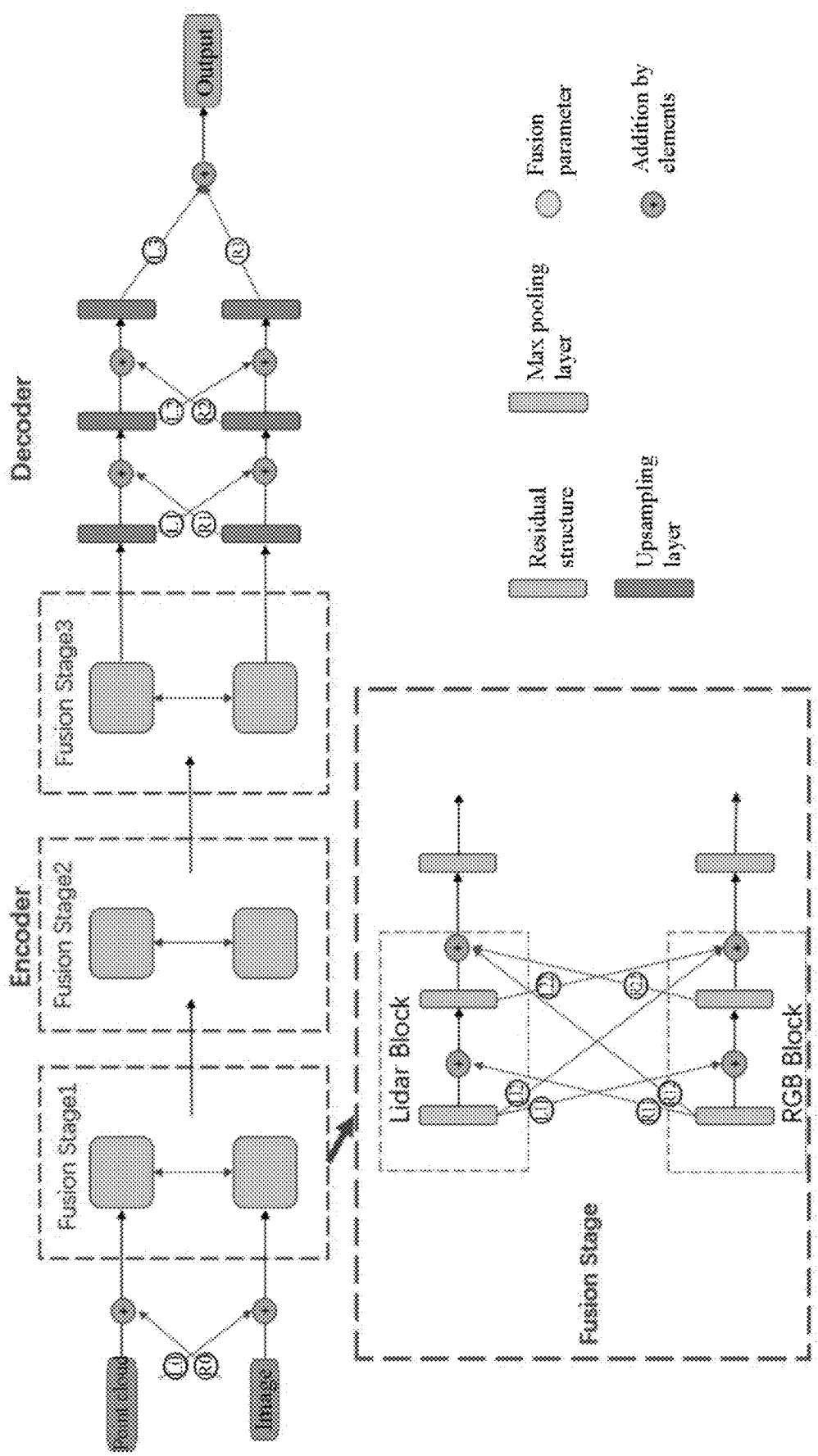
FIG. 3 is a structure diagram of a SkipCrossNet model provided in Embodiment 1 of the present invention.

The semantic segmentation model may be any neural network model with a prediction function, or called a semantic segmentation function, and an image generation function, such as a full convolutional network (FCN). Exemplarily, as a preferred solution, a SkipCrossNet semantic segmentation model proposed in the present invention is adopted. Exemplary description herein is all based on the model. As shown in FIG. 3, the SkipCrossNet semantic segmentation model consists of a point cloud branch and an image branch, wherein the point cloud branch and the image branch are each composed of an encoder (Encoder) and a decoder (Decoder). Fusion parameters in the model are trainable parameters, values of which are between [0, 1], which indicates no fusion at 0, and indicates fusion otherwise.

Figure 4:
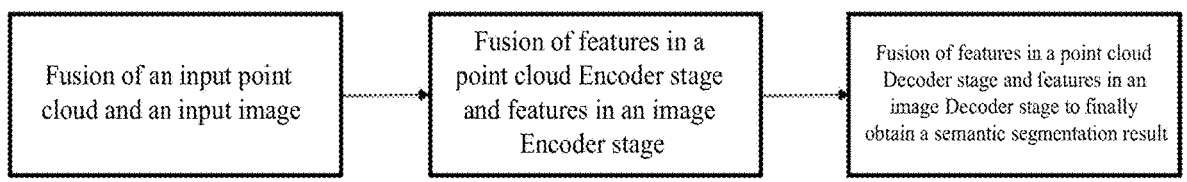
FIG. 4 is a schematic diagram of three stages of cross-layer intersecting fusion provided in Embodiment 1 of the present invention.

Specifically, three parts are described, as shown in FIG. 4, which are fusion of an input point cloud and an input image, fusion of features in a point cloud Encoder stage and image features, and fusion of features in a point cloud Decoder stage and features in an image Decoder stage, respectively.

Part I: fusion of an input point cloud and an input image.

The fusion is implemented by addition by elements, and the addition does not change the resolution of a feature map as well as the number of channels, so the across-layer intersecting fusion has almost no effect on the number of parameters in the network.

Exemplarily, according to FIG. 3, a point cloud and an image are input, and image to point cloud fusion is:

$$Lidar_f = R_0 * RGB + Lidar$$

where Lidar is the point cloud, RGB is the image, $Lidar_f$ is a point cloud after fusion, and $R_0$ is a fusion parameter.

Point cloud to image fusion is:

$$RGB_f = L_0 * Lidar + RGB$$

where $RGB_f$ is an image after fusion, and $L_0$ is a fusion parameter.

Part II: fusion of features in a point cloud Encoder stage and features in an image Encoder stage.

Exemplarily, according to FIG. 3, $Lidar_f$ and $RGB_f$ after fusion described above are acquired, and features in a point cloud Encoder stage and features in an image Encoder stage are fused.

First, the point cloud Encoder stage and the image Encoder stage are divided into 3 sub-stages, as in FIG. 3, which are a fusion stage 1, a fusion stage 2 and a fusion stage 3, respectively, but not limited to 3 and may be more sub-stages. For ease of description, cross-layer intersecting fusion is performed in each sub-stage.

Exemplarily, according to the network structure diagram of FIG. 3, in the fusion stage 1, a Lidar Block contains two layers, and an RGB Block contains two layers. A point cloud branch and an image branch in the fusion stage 1 are described respectively below.

1. For the point cloud branch, a first-layer feature of the Lidar Block is fused with a first-layer feature of the RGB Block to obtain a fused first-layer feature of the point cloud branch:

$$Lidar\_L1\_Feature_f = R_{11} * RGB\_L1\_feature + Lidar\_L1\_Feature$$

where $Lidar\_L1\_Feature_f$ represents the fused first-layer feature of the point cloud branch, $Lidar\_L1\_Feature$ represents the first-layer feature of the Lidar Block, $RGB\_L1\_feature$ represents the first-layer feature of the RGB Block, and $R_{11}$ represents a fusion parameter of the first-layer feature of the RGB Block to the first-layer feature of the Lidar Block.

A second-layer feature of the Lidar Block is fused with the first-layer feature and a second-layer feature of the RGB Block to obtain a fused second-layer feature of the point cloud branch:

$$Lidar\_L2\_Feature_f = R_{12} * RGB\_L_1\_feature + R_{22} * RGB\_L2\_feature + Lidar\_L2\_Feature$$

where $Lidar\_L2\_Feature_f$ represents the fused second-layer feature of the point cloud branch, $RGB\_L2\_Feature$ represents the second-layer feature of the RGB Block, $Lidar\_L2\_feature$ represents the second-layer feature of the Lidar Block, $R_{12}$ represents a fusion parameter of the first-layer feature of the RGB Block to the second-layer feature of the Lidar Block, and $R_{22}$ represents a fusion parameter of the second-layer feature of the RGB Block to the second-layer feature of the Lidar Block.

2. For the image branch, the first-layer feature of the RGB Block is fused with the first-layer feature of the Lidar Block to obtain a fused first-layer feature of the image branch.

$$RGB\_L1\_Feature_f = L_{11} * Lidar\_L1\_feature + RGB\_L1\_Feature$$

where $RGB\_L1\_Feature_f$ represents the fused first-layer feature of the image branch, $RGB\_L1\_Feature$ represents the first-layer feature of the RGB Block, $Lidar\_L1\_feature$ represents the first-layer feature of the Lidar Block, and $L_{11}$ represents a fusion parameter of the first-layer feature of the Lidar Block to the first-layer feature of the RGB Block.

The second-layer feature of the RGB Block is fused with the first-layer feature and the second-layer feature of the Lidar Block to obtain a fused second-layer feature of the image branch:

$$RGB\_L2\_Feature_f = L_{12} * Lidar\_L1\_feature + L_{22} * Lidar\_L2\_feature + RGB\_L2\_Feature$$

where $RGB\_L2\_Feature_f$ represents the fused second-layer feature of the image branch, $RGB\_L2\_Feature$ represents the second-layer feature of the RGB Block, $Lidar\_L2\_feature$ represents the second-layer feature of the Lidar Block, $L_{12}$ represents a fusion parameter of the first-layer feature of the Lidar Block to the second-layer feature of the RGB Block, and $L_{22}$ represents a fusion parameter of the second-layer feature of the Lidar Block to the second-layer feature of the RGB Block.

Part III: fusion of features in a point cloud Decoder stage and features in an image Decoder stage to finally obtain a semantic segmentation result.

As shown in FIG. 3, the point cloud Decoder stage and the image Decoder stage each have three layers. A point cloud branch and an image branch are described respectively below.

1. For the point cloud branch

A first-layer feature in the point cloud Decoder stage is fused with a first-layer feature in the image Decoder stage:

$$Lidar\_L_{D1}\_Feature_f = R_1 * RGB\_L_{D1}\_feature + Lidar\_L_{D1}\_feature$$

where $Lidar\_L_{D1}\_Feature_f$ represents a fused first-layer feature in the point cloud Decoder stage, $RGB\_L_{D1}\_feature$ represents the first-layer feature in the image Decoder stage, $Lidar\_L_{D1}\_feature$ represents the first-layer feature in the point cloud Decoder stage, and $R_1$ represents a fusion parameter of the first-layer feature in the image Decoder stage to the first-layer feature in the point cloud Decoder stage.

A second-layer feature in the point cloud Decoder stage is fused with a second-layer feature in the image Decoder stage:

$$Lidar\_L_{D2}\_Feature_f = R_2 * RGB\_L_{D2}\_feature + Lidar\_L_{D2}\_feature$$

where $Lidar\_L_{D2}\_Feature_f$ represents a fused second-layer feature in the point cloud Decoder stage, $RGB\_L_{D2}\_feature$ represents the second-layer feature in the image Decoder stage, $Lidar\_L_{D2}\_feature$ represents the second-layer feature in the point cloud Decoder stage, and $R_2$ represents a fusion parameter of the second-layer feature in the image Decoder stage to the second-layer feature in the point cloud Decoder stage.

2. For the image branch

The first-layer feature in the image Decoder stage is fused with the first-layer feature in the point cloud Decoder stage:

$$RGB\_L_{D1}\_Feature_f = L_1 * Lidar\_L_{D1}\_feature + RGB\_L_{D1}\_feature$$

where $RGB\_L_{D1}\_Feature_f$ represents a fused first-layer feature in the image Decoder stage, $Lidar\_L_{D1}\_feature$ represents the first-layer feature in the point cloud Decoder stage, $RGB\_L_{D1}\_feature$ represents the first-layer feature in the image Decoder stage, and $L_1$ represents a fusion parameter of the first-layer feature in the point cloud Decoder stage to the first-layer feature in the image Decoder stage.

A second-layer feature RGB_Decoder_L2_Feature in the image Decoder stage is fused with a second-layer feature Lidar_Decoder_L2_Feature in the point cloud Decoder stage:

$$RGB\_L_{D2}\_Feature_f = L_2 * Lidar\_L_{D2}\_feature + RGB\_L_{D2}\_feature$$

where $RGB\_L_{D2}\_Feature_f$ represents a fused second-layer feature in the image Decoder stage, $Lidar\_L_{D2}\_feature$ represents the second-layer feature in the point cloud Decoder stage, $RGB\_L_{D2}\_feature$ represents the second-layer feature in the image Decoder stage, and $L_2$ represents a fusion parameter of the second-layer feature in the point cloud Decoder stage to the second-layer feature in the image Decoder stage.

The third layer of the Decoder stage is the final fusion layer of the entire network.

$$Output = L_3 * Lidar\_L_{D3}\_feature + R_3 RGB\_L_{D3}\_feature$$

where Output represents a fusion output from the third layer, $Lidar\_L_{D3}\_feature$ represents a third-layer feature in the point cloud Decoder stage, $RGB\_L_{D3}\_feature$ represents a third-layer feature in the image Decoder stage, and $L_3$ represents a fusion parameter of the third-layer feature in the point cloud Decoder stage to the third-layer feature in the image Decoder stage.

The number of fusions in the Decoder stage is same as the number of fusion stages in the Encoder stage.

The neural network model may be either pre-trained or trained based on local data. An exemplary training process of the neural network model is described below.

Exemplarily, for a preprocessing process, an input size of the point cloud is specified to be (512, 256, 1) and an input size of the image is specified to be (512, 256, 3). Preset cropping is performed on the point cloud and the image to meet input requirements of the network.

It may be understood by a person skilled in the art as a training process of the neural network model, which is not detailed herein but briefly described as follows.

Exemplarily, for a neural network implemented based on a tool PyTorch, a sample point cloud and image is added to a list of inputs as an input, and after hyperparameters of the network that need to be manually preset such as the quantity of batch processing and the number of training rounds, training is started, an encoder calculates an implicit vector of an intermediate layer, then a decoder performs decoding to obtain an image, which is compared with a target output, and after a loss value loss is calculated according to a loss function, network parameters are updated in a back propagation step, thus completing a round of training. After a certain number of training rounds, the loss value will no longer decrease or oscillates around a certain value, and training may stop at that time.

Exemplarily, for the loss function and activation functions of the neural network, in this embodiment, a common cross entropy is used as the loss function, and Softmax and ReLu are used as the activation functions. It should be understood that the functions may also be substituted with other functions here, but this may have some influence on the performance of the neural network.

After training of the neural network is completed, testing of new images may be started. Those of ordinary skill in the art may appreciate that units and algorithm steps of examples described in conjunction with the embodiments disclosed herein can be implemented in electronic hardware or a combination of computer software and electronic hardware. Whether these functions are performed in hardware or software depends on the specific application and design constraints of the solution. Professional technical persons may use different methods for each specific application to implement the described functions, but such implementation should not be considered as beyond the scope of the present invention.

S103: the semantic segmentation model outputs an image segmentation result, which may be used for lane line segmentation, road segmentation, etc.

Embodiment 2

Figure 5:
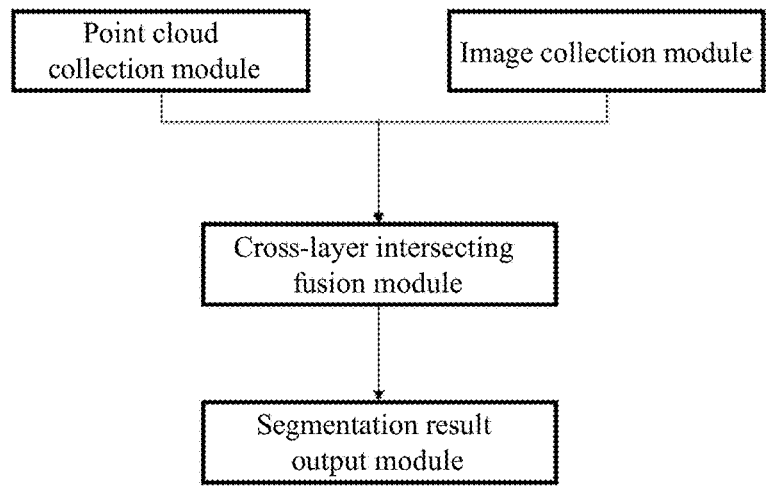
FIG. 5 is a schematic diagram of composition of a deep multimodal cross-layer intersecting fusion system provided in Embodiment 2 of the present invention.

As shown in FIG. 5, Embodiment 2 of the present invention discloses a deep multimodal cross-layer intersecting fusion system, which includes a point cloud collection module, an image collection module, a cross-layer intersecting fusion module, and a segmentation result output module, wherein:

the point cloud collection module is configured to collect lidar point cloud data;

the image collection module is configured to collect RGB images on a road surface captured by a vehicle-mounted camera;

the cross-layer intersecting fusion module is configured for intersecting fusion of a pre-processed RGB image and point cloud data by means of a semantic segmentation model; the semantic segmentation model is configured to implement cross-layer intersecting fusion of the RGB image and the point cloud data, fusion processing of the point cloud data and the RGB image including three subparts: fusion of an input point cloud and an input image, fusion of features in a point cloud Encoder stage and features in an image Encoder stage, and fusion of features in a point cloud Decoder stage and features in an image Decoder stage; and the segmentation result output module is configured to output an image segmentation result.

Embodiment 3

Figure 6:
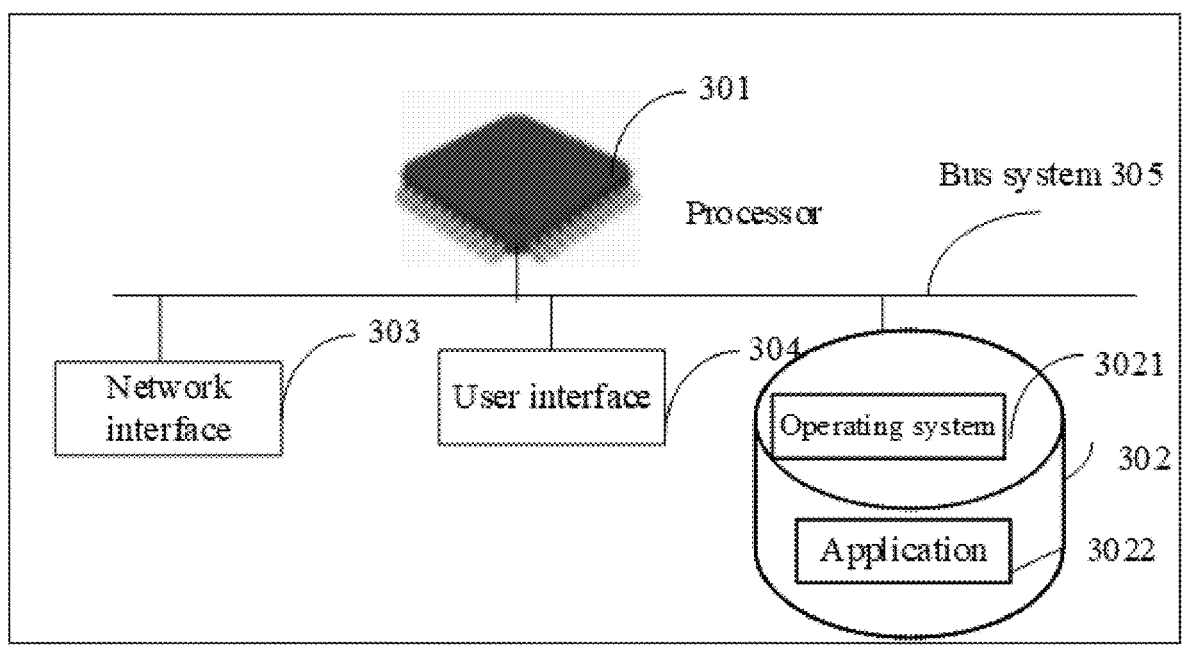
FIG. 6 is a schematic diagram of a terminal device provided in Embodiment 3 of the present invention.

As shown in FIG. 6, Embodiment 3 of the present invention provides a terminal device, which includes at least one processor 301, a memory 302, at least one network interface 303, and a user interface 304. The components are coupled together via a bus system 305. It may be understood that the bus system 305 is configured to implement connection communication between these components. The bus system 305 includes a power bus, a control bus, and a status signal bus in addition to a data bus. However, for the sake of clarity, the various buses are marked as the bus system 305 in the diagram.

The user interface 304 may include a display, a keyboard, or a clicking device (e.g., a mouse, a track ball, a touch pad, or a touch screen).

It may be understood that the memory 302 in embodiments of the present disclosure may be volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be random access memory (RAM), which is used as an external cache. By way of exemplary but not restrictive description, many forms of RAMs may be used, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), and a direct Rambus RAM (DRRAM). The memory 302 described herein is intended to include, but is not limited to, these and any other suitable types of memory.

In some implementations, the memory 302 stores the following elements, executable modules or data structures, or a subset thereof, or an extended set thereof: an operating system 3021 and an application 3022.

The operating system 3021 contains various system programs, such as a framework layer, a core library layer, and a driver layer, for implementing various basic services and performing hardware-based tasks. The application 3022 contains various applications, such as a media player, and a browser, for implementing various application services. A program for implementing the method of embodiments of the present disclosure may be included in the application 3022.

In embodiments of the present disclosure, by calling a program or instructions stored in the memory 302, which may specifically be a program or instructions stored in the application 3022, the processor 301 is configured to:

execute the steps of the method of Embodiment 1.

The method of Embodiment 1 may be applied in the processor 301 or implemented by the processor 301. The processor 301 may be an integrated circuit chip with signal processing capability. During implementation, the steps of the above-mentioned method may be accomplished by an integrated logic circuit in the form of hardware or instructions in the form of software in the processor 301. The above-mentioned processor 301 may be a general-purpose processor, a digital signal processor (DSP), an application specific integrated circuit (ASIC), a field programmable gate array (FPGA) or other programmable logic device, a discrete gate or transistor logic device, or a discrete hardware component. The various methods, steps and logical block diagrams disclosed in Embodiment 1 may be implemented or executed. The general-purpose processor may be a microprocessor, or the processor may also be any conventional processor or the like. The steps of the method disclosed in conjunction with Embodiment 1 may be directly embodied in hardware and executed by a decoding processor, or executed by a combination of hardware and software modules in a decoding processor. The software module may be in a storage medium mature in the art, such as a random memory, a flash memory, a read-only memory, a programmable read-only memory or electrically erasable programmable memory, or a register. The storage medium is in the memory 302, and the processor 301 reads information in the memory 302 and accomplishes the steps of the above-mentioned method in conjunction with hardware thereof.

It may be understood that these embodiments described in the present invention may be implemented with hardware, software, firmware, middleware, microcodes, or a combination thereof. For hardware implementation, the processing unit may be implemented in one or more application specific integrated circuits (ASICs), digital signal processors (DSPs), digital signal processing devices (DSP Devices, DSPDs), programmable logic devices (PLDs), field-programmable gate arrays (FPGAs), general-purpose processors, controllers, microprocessors, microcontrollers, other electronic units for performing the functions described in the present application, or a combination thereof.

For software implementation, the technology of the present invention may be implemented by executing functional modules (e.g., processes, and functions) of the present invention. Software codes may be stored in the memory and executed by the processor. The memory may be implemented in the processor or outside the processor.

Embodiment 4

Embodiment 4 of the present invention provides a non-volatile storage medium configured to store a computer program. When the computer program is executed by the processor, the steps in the above method embodiment may be implemented.

It should be noted that the above embodiments illustrate rather than limit the present invention, and alternative embodiments may be devised by those skilled in the art without departing from the scope of the appended claims. In a claim, any reference signs located between brackets should not be construed as limiting the claim. The word "comprise" does not exclude the presence of an element or step not listed in the claim. The present invention may be implemented by means of an algorithm that includes different computational steps, and simple algorithms enumerated in the embodiments should not be considered as limiting the claimed rights of the present invention. The use of the words first, second, third and the like does not indicate any order. These words may be interpreted as names.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

What is claimed is:

1. A deep multimodal cross-layer intersecting fusion method, comprising:
    acquiring an RGB image and point cloud data containing lane lines, and pre-processing the RGB image and point cloud data; and
    inputting the pre-processed RGB image and point cloud data into a pre-constructed and trained semantic segmentation model, and outputting an image segmentation result, wherein the semantic segmentation model is configured to implement cross-layer intersecting fusion of the RGB image and point cloud data;
    wherein, the semantic segmentation model is a SkipCrossNet model composed of a point cloud branch and an image branch, and the model is divided into three fusion units:
        a first fusion unit configured for intersecting fusion of the point cloud data and the RGB image;
        a second fusion unit configured for fusion of features in a point cloud Encoder stage and features in an image Encoder stage; and a third fusion unit configured for fusion of features in a point cloud Decoder stage and features in an image Decoder stage.

2. The deep multimodal cross-layer intersecting fusion method according to claim 1, wherein
the RGB image is obtained by a forward-facing monocular photographic camera or forward-facing monocular camera mounted on a traveling vehicle;
the RGB image contains road image information directly in front of the traveling vehicle in a driving direction thereof and above a road surface;
the point cloud data is obtained by a lidar mounted on the traveling vehicle; and
the RGB image and the point cloud data are collected synchronously.

3. The deep multimodal cross-layer intersecting fusion method according to claim 1, wherein
a specific implementation process of the first fusion unit is as follows:
image to point cloud fusion:

$$Lidar_f = R_0 * RGB + Lidar$$

wherein, Lidar is the acquired point cloud data, RGB is the acquired RGB image, $Lidar_f$ is point cloud data after fusion, and $R_0$ is a fusion parameter; and
point cloud to image fusion:

$$RGB_f = L_0 * Lidar + RGB$$

wherein, $RGB_f$ is an image after fusion, and $L_0$ is a fusion parameter; and
$Lidar_f$ and $RGB_f$ are output to the second fusion unit.

4. The deep multimodal cross-layer intersecting fusion method according to claim 3, wherein
the second fusion unit comprises N fusion stages; an input to a first fusion stage is: $Lidar_f$ and $RGB_f$ output by first fusion subunits; an input to an $i^{th}$ fusion stage is an output from an $(i-1)^{th}$ fusion stage; an output from an $N^{th}$ fusion stage is an input to the third fusion unit, a number of fusions of each fusion stage is preset; and
when the number of fusions in a fusion stage is M, a specific implementation process of the fusion stage is as follows;
for the point cloud branch, a first-layer feature of a Lidar Block is fused with a first-layer feature of an RGB Block:

$$Lidar\_L_E\_Feature_2 = S_{11} * RGB\_L_E\_Feature_1 + Lidar\_L_E\_Feature_1$$

wherein, $Lidar\_L_E\_Feature_2$ represents a second-layer feature of the Lidar Block, $Lidar\_L_E\_Feature_1$ represents the first-layer feature of the Lidar Block, i.e. a point cloud feature input to the fusion stage; $RGB\_L_E\_Feature_1$ represents the first-layer feature of the RGB Block, i.e. an image feature input to the fusion stage; and $S_{11}$ represents a fusion parameter of the first-layer feature of the RGB Block to the first-layer feature of the Lidar Block;
when $2 \le m \le M-1$, an $m^{th}$-layer feature of the Lidar Block is fused with all features of first m layers of the RGB Block to obtain an $(m+1)^{th}$-layer feature $Lidar\_L_E\_Feature_m$ of the Lidar Block:

$$Lidar\_L_E\_Feature_{m+1} = \sum_{k=1}^{m} S_{k,m} * RGB\_L_E\_Feature_k + Lidar\_L_E\_Feature_m$$

wherein, $RGB\_L_E\_Feature_k$ represents a $k^{th}$-layer feature of the RGB Block; $S_{k,m}$ represents a fusion parameter of the $k^{th}$-layer feature of the RGB Block to the $m^{th}$-layer feature of the Lidar Block; and $Lidar\_L_E\_Feature_m$ represents the $m^{th}$-layer feature of the Lidar Block; and
for the image branch, the first-layer feature of the RGB Block is fused with the first-layer feature of the Lidar Block:

$$RGB\_L_E\_Feature_2 = T_{11} * Lidar\_L_E\_Feature_1 + RGB\_L_E\_Feature_1$$

wherein, $RGB\_L_E\_Feature_2$ represents a second-layer feature of the RGB Block, and $T_{11}$ represents a fusion parameter of the first-layer feature of the Lidar Block to the first-layer feature of the RGB Block;
when $2 \le m \le M-1$, an $m^{th}$-layer feature of the RGB Block is fused with all features of first m layers of the Lidar Block to obtain an $(m+1)^{th}$-layer feature $RGB\_L_E\_Feature_m$ of the RGB Block:

$$RGB\_L_E\_Feature_{m+1} = \sum_{k=1}^{m} T_{k,m} * Lidar\_L_E\_Feature_k + RGB\_L_E\_Feature_m$$

wherein, $Lidar\_L_E\_Feature_k$ represents a $k^{th}$-layer feature of the Lidar Block; $T_{k,m}$ represents a fusion parameter of the $k^{th}$-layer feature of the Lidar Block to the $m^{th}$-layer feature of the RGB Block; and $RGB\_L_E\_Feature_m$ represents the $m^{th}$-layer feature of the RGB Block; and
an output of the fusion stage is $Lidar\_L_E\_Feature_M$ and $RGB\_L_E\_Feature_M$.

5. The deep multimodal cross-layer intersecting fusion method according to claim 4, wherein
a specific implementation process of the third fusion unit is as follows:
a first-layer feature in the point cloud Decoder stage is fused with a first-layer feature in the image Decoder stage:

$$Lidar\_L_D\_Feature_2 = R_1 * RGB\_L_D\_Feature_1 + Lidar\_L_D\_Feature_1$$

wherein, $Lidar\_L_D\_Feature_2$ represents a second-layer feature in the point cloud Decoder stage, $RGB\_L_D\_Feature_1$ represents the first-layer feature in the image Decoder stage, i.e. an image feature output by the second fusion unit; $Lidar\_L_D\_Feature_1$ represents the first-layer feature in the point cloud Decoder stage, i.e. a point cloud feature output by the second fusion unit; and $R_1$ represents a fusion parameter of the first-layer feature in the image Decoder stage to the first-layer feature in the point cloud Decoder stage;
the first-layer feature in the image Decoder stage is fused with the first-layer feature in the point cloud Decoder stage:

$$RGB\_L_D\_Feature_2 = L_1 * Lidar\_L_D\_Feature_1 + RGB\_L_D\_Feature_1$$

wherein, $RGB\_L_D\_Feature_2$ represents a second-layer feature in the image Decoder stage; and $L_1$ represents a fusion parameter of the first-layer feature in the point cloud Decoder stage to the first-layer feature in the image Decoder stage;

when 2≤i≤N−1, an $i^{th}$-layer feature in the point cloud Decoder stage is fused with an $i^{th}$-layer feature in the image Decoder stage:

$$\text{Lidar\_}L_D\text{\_Feature}_{i+1}=R_i*\text{RGB\_}L_D\text{\_Feature}_i+\text{Lidar\_}L_D\text{\_Feature}_i$$

wherein, Lidar\_$L_D$\_Feature$_{i+1}$ represents an $(i+1)^{th}$-layer feature in the point cloud Decoder stage, RGB\_$L_D$\_Feature$_i$ represents the $i^{th}$-layer feature in the image Decoder stage, Lidar\_$L_D$\_Feature$_i$ represents the $i^{th}$-layer feature in the point cloud Decoder stage, and $R_1$ represents a fusion parameter of the $i^{th}$-layer feature in the image Decoder stage to the $i^{th}$-layer feature in the point cloud Decoder stage;

the $i^{th}$-layer feature in the image Decoder stage is fused with the $i^{th}$-layer feature in the point cloud Decoder stage:

$$\text{RGB\_}L_D\text{\_Feature}_{i+1}=L_i*\text{Lidar\_}L_D\text{\_Feature}_i+\text{RGB\_}L_D\text{\_Feature}_i$$

wherein, RGB\_$L_D$\_Feature$_{i+1}$ represents an $(i+1)^{th}$-layer feature in the image Decoder stage; and $L_i$ represents a fusion parameter of the $i^{th}$-layer feature in the point cloud Decoder stage to the $i^{th}$-layer feature in the image Decoder stage; and an output Output of the third fusion unit is:

$$\text{Output}=L_N*\text{Lidar\_}L_D\text{\_Feature}_N+R_N*\text{RGB\_}L_D\text{\_Feature}_N$$

wherein, Lidar\_$L_D$\_Feature$_N$ represents an $N^{th}$-layer feature in the point cloud Decoder stage, RGB\_$L_D$\_Feature$_N$ represents an $N^{th}$-layer feature in the image Decoder stage, and $L_N$ and $R_N$ represent fusion parameters of the $N^{th}$ layer in the point cloud Decoder stage.

6. The deep multimodal cross-layer intersecting fusion method according to claim 5, further comprising: establishing a training set, and training the semantic segmentation model to obtain fusion parameters therein, wherein
values of the fusion parameters are all within [0, 1].

7. A terminal device, comprising a memory, a processor, and a computer program stored in the memory and executable by the processor, wherein
the processor executes the computer program to implement the method of claim 1.

8. A non-transitory storage medium, wherein the storage medium stores a computer program, wherein a processor executes a computer program to implement the method of claim 1.

9. The terminal device according to claim 7, wherein
the RGB image is obtained by a forward-facing monocular photographic camera or forward-facing monocular camera mounted on a traveling vehicle;
the RGB image contains road image information directly in front of the traveling vehicle in a driving direction thereof and above a road surface;
the point cloud data is obtained by a lidar mounted on the traveling vehicle; and
the RGB image and the point cloud data are collected synchronously.

10. The terminal device according to claim 7, wherein
a specific implementation process of the first fusion unit is as follows:
image to point cloud fusion:

$$\text{Lidar}_f=R_0*RGB+\text{Lidar}$$

wherein, Lidar is the acquired point cloud data, RGB is the acquired RGB image, Lidar$_f$ is point cloud data after fusion, and $R_0$ is a fusion parameter; and point cloud to image fusion:

$$RGB_1=L_0*\text{Lidar}+RGB$$

wherein, RGB$_f$ is an image after fusion, and $L_0$ is a fusion parameter; and
Lidar$_f$ and RGB$_f$ are output to the second fusion unit.

11. The terminal device according to claim 10, wherein
the second fusion unit comprises N fusion stages; an input to a first fusion stage is: Lidar$_f$ and RGB$_f$ output by first fusion subunits; an input to an $i^{th}$ fusion stage is an output from an $(i-1)^{th}$ fusion stage; an output from an $N^{th}$ fusion stage is an input to the third fusion unit; a number of fusions of each fusion stage is preset; and when the number of fusions in a fusion stage is M, a specific implementation process of the fusion stage is as follows:
for the point cloud branch, a first-layer feature of a Lidar Block is fused with a first-layer feature of an RGB Block:

$$\text{Lidar\_}L_E\text{\_Feature}_2=S_{11}*\text{RGB\_}L_E\text{\_Feature}_1+\text{Lidar\_}L_E\text{\_Feature}_1$$

wherein, Lidar\_$L_E$\_Feature$_2$ represents a second-layer feature of the Lidar Block, Lidar\_$L_E$\_Feature$_1$ represents the first-layer feature of the Lidar Block, i.e. a point cloud feature input to the fusion stage; RGB\_$L_E$\_Feature$_1$ represents the first-layer feature of the RGB Block, i.e. an image feature input to the fusion stage; and $S_{11}$ represents a fusion parameter of the first-layer feature of the RGB Block to the first-layer feature of the Lidar Block;

when 2≤m≤M−1, an $m^{th}$-layer feature of the Lidar Block is fused with all features of first m layers of the RGB Block to obtain an $(m+1)^{th}$-layer feature Lidar\_$L_E$\_Feature$_m$ of the Lidar Block:

$$\text{Lidar\_}L_E\text{\_Feature}_{m+1} = \sum_{k=1}^{m} S_{k,m}*\text{RGB\_}L_E\text{\_Feature}_k + \text{Lidar\_}L_E\text{\_Feature}_m$$

wherein, RGB\_$L_E$\_Feature$_k$ represents a $k^{th}$-layer feature of the RGB Block, $S_{k,m}$ represents a fusion parameter of the $k^{th}$-layer feature of the RGB Block to the $m^{th}$-layer feature of the Lidar Block; and Lidar\_$L_E$\_Feature$_m$ represents the $m^{th}$-layer feature of the Lidar Block; and for the image branch, the first-layer feature of the RGB Block is fused with the first-layer feature of the Lidar Block:

$$RGB\_L_E\text{\_Feature}_2=T_{11}*\text{Lidar\_}L_E\text{\_Feature}_1+RGB\_L_E\text{\_Feature}_1$$

wherein, RGB\_$L_E$\_Feature$_2$ represents a second-layer feature of the RGB Block, and $T_{11}$ represents a fusion parameter of the first-layer feature of the Lidar Block to the first-layer feature of the RGB Block;

when 2≤m≤M−1, an $m^{th}$-layer feature of the RGB Block is fused with all features of first m layers of the Lidar Block to obtain an $(m+1)^{th}$-layer feature RGB\_$L_E$\_Feature$_m$ of the RGB Block:

$$RGB\_L_E\text{\_Feature}_{m+1} = \sum_{k=1}^{m} T_{k,m}*\text{Lidar\_}L_E\text{\_Feature}_k + RGB\_L_E\text{\_Feature}_m$$

wherein, Lidar\_$L_E$\_Feature$_k$ represents a $k^{th}$-layer feature of the Lidar Block; $T_{k,m}$ represents a fusion parameter of the $k^{th}$-layer feature of the Lidar Block to the $m^{th}$-layer feature of the RGB Block; and RGB_$L_E$_Feature$_m$ represents the $m^{th}$-layer feature of the RGB Block; and an output of the fusion stage is Lidar_$L_E$_Feature$_M$ and RGB_$L_E$_Feature$_M$.

12. The terminal device according to claim 11, wherein a specific implementation process of the third fusion unit is as follows:

a first-layer feature in the point cloud Decoder stage is fused with a first-layer feature in the image Decoder stage:

$$\text{Lidar\_}L_D\text{\_Feature}_2 = R_1 * \text{RGB\_}L_D\text{\_Feature}_1 + \text{Lidar\_}L_D\text{\_Feature}_1$$

wherein, Lidar_$L_D$_Feature$_2$ represents a second-layer feature in the point cloud Decoder stage, RGB_$L_D$_Feature$_1$ represents the first-layer feature in the image Decoder stage, i.e. an image feature output by the second fusion unit; Lidar_$L_D$_Feature$_1$ represents the first-layer feature in the point cloud Decoder stage, i.e. a point cloud feature output by the second fusion unit; and $R_1$ represents a fusion parameter of the first-layer feature in the image Decoder stage to the first-layer feature in the point cloud Decoder stage;

the first-layer feature in the image Decoder stage is fused with the first-layer feature in the point cloud Decoder stage:

$$RGB\_L_D\_\text{Feature}_2 = L_1 * \text{Lidar\_}L_D\_\text{Feature}_1 + RGB\_L_D\_\text{Feature}_1$$

wherein, RGB_$L_D$_Feature$_2$ represents a second-layer feature in the image Decoder stage; and $L_1$ represents a fusion parameter of the first-layer feature in the point cloud Decoder stage to the first-layer feature in the image Decoder stage;

when $2 \leq i \leq N-1$, an $i^{th}$-layer feature in the point cloud Decoder stage is fused with an $i^{th}$-layer feature in the image Decoder stage:

$$\text{Lidar\_}L_D\_\text{Feature}_{i+1} = R_1 * RGB\_L_D\_\text{Feature}_i + \text{Lidar\_}L_D\_\text{Feature}_i$$

wherein, Lidar_$L_D$_Feature$_{i+1}$ represents an $(i+1)^{th}$-layer feature in the point cloud Decoder stage, RGB_$L_D$_Feature$_i$ represents the $i^{th}$-layer feature in the image Decoder stage, Lidar_$L_D$_Feature$_i$ represents the $i^{th}$-layer feature in the point cloud Decoder stage, and $R_1$ represents a fusion parameter of the $i^{th}$-layer feature in the image Decoder stage to the $i^{th}$-layer feature in the point cloud Decoder stage;

the $i^{th}$-layer feature in the image Decoder stage is fused with the $i^{th}$-layer feature in the point cloud Decoder stage:

$$RGB\_L_D\_\text{Feature}_{i+1} = L_1 * \text{Lidar\_}L_D\_\text{Feature}_i + RGB\_L_D\_\text{Feature}_i$$

wherein, RGB_$L_D$_Feature$_{i+1}$ represents an $(i+1)^{th}$-layer feature in the image Decoder stage; and $L_1$ represents a fusion parameter of the $i^{th}$-layer feature in the point cloud Decoder stage to the $i^{th}$-layer feature in the image Decoder stage; and an output Output of the third fusion unit is:

$$\text{Output} = L_N * \text{Lidar\_}L_D\_\text{Feature}_N + R_N * RGB\_L_D\_\text{Feature}_N$$

wherein, Lidar_$L_D$_Feature$_N$ represents an $N^{th}$-layer feature in the point cloud Decoder stage, RGB_$L_D$_Feature$_N$ represents an $N^{th}$-layer feature in the image Decoder stage, and $L_N$ and $R_N$ represent fusion parameters of the $N^{th}$ layer in the point cloud Decoder stage.

13. The terminal device according to claim 12, further comprising: establishing a training set, and training the semantic segmentation model to obtain fusion parameters therein, wherein values of the fusion parameters are all within [0, 1].

14. The storage medium according to claim 8, wherein the RGB image is obtained by a forward-facing monocular photographic camera or forward-facing monocular camera mounted on a traveling vehicle;

the RGB image contains road image information directly in front of the traveling vehicle in a driving direction thereof and above a road surface;

the point cloud data is obtained by a lidar mounted on the traveling vehicle; and the RGB image and the point cloud data are collected synchronously.

15. The storage medium according to claim 8, wherein a specific implementation process of the first fusion unit is as follows:

image to point cloud fusion:

$$\text{Lidar}_f = R_0 * RGB + \text{Lidar}$$

wherein, Lidar is the acquired point cloud data, RGB is the acquired RGB image, Lidar$_f$ is point cloud data after fusion, and $R_0$ is a fusion parameter; and point cloud to image fusion:

$$RGB_f = L_0 * \text{Lidar} + RGB$$

wherein, RGB$_f$ is an image after fusion, and $L_0$ is a fusion parameter; and

Lidar$_f$ and RGB$_f$ are output to the second fusion unit.

16. The storage medium according to claim 15, wherein the second fusion unit comprises N fusion stages; an input to a first fusion stage is: Lidar$_f$ and RGB$_f$ output by first fusion subunits; an input to an $i^{th}$ fusion stage is an output from an $(i-1)^{th}$ fusion stage; an output from an $N^{th}$ fusion stage is an input to the third fusion unit; a number of fusions of each fusion stage is preset; and when the number of fusions in a fusion stage is M, a specific implementation process of the fusion stage is as follows:

for the point cloud branch, a first-layer feature of a Lidar Block is fused with a first-layer feature of an RGB Block:

$$\text{Lidar\_}L_E\_\text{Feature}_2 = S_{11} * RGB\_L_E\text{Feature}_1 + \text{Lidar\_}L_E\_\text{Feature}_1$$

wherein, Lidar_$L_E$_Feature$_2$ represents a second-layer feature of the Lidar Block, Lidar_$L_E$_Feature$_1$ represents the first-layer feature of the Lidar Block, i.e. a point cloud feature input to the fusion stage; RGB_$L_E$_Feature$_1$ represents the first-layer feature of the RGB Block, i.e. an image feature input to the fusion stage; and $S_{11}$ represents a fusion parameter of the first-layer feature of the RGB Block to the first-layer feature of the Lidar Block;

when $2 \leq m \leq M-1$, an $m^{th}$-layer feature of the Lidar Block is fused with all features of first m layers of the RGB Block to obtain an $(m+1)^{th}$-layer feature Lidar_$L_E$_Feature$_m$ of the Lidar Block:

$$\text{Lidar\_}L_E\_\text{Feature}_{m+1} = \sum_{k=1}^{m} S_{k,m} * RGB\_L_E\_\text{Feature}_k + \text{Lidar\_}L_E\_\text{Feature}_m$$

wherein, $RGB\_L_E\_Feature_k$ represents a $k^{th}$-layer feature of the RGB Block; $S_{k,m}$ represents a fusion parameter of the $k^{th}$-layer feature of the RGB Block to the $m^{th}$-layer feature of the Lidar Block; and $Lidar\_L_E\_Feature_m$ represents the $m^{th}$-layer feature of the Lidar Block; and for the image branch, the first-layer feature of the RGB Block is fused with the first-layer feature of the Lidar Block:

$RGB\_L_E\_Feature_2 = T_{11} * Lidar\_L_E\_Feature_1 + RGB\_L_E\_Feature_1$ wherein, $RGB\_L_E\_Feature_2$ represents a second-layer feature of the RGB Block, and $T_{11}$ represents a fusion parameter of the first-layer feature of the Lidar Block to the first-layer feature of the RGB Block;

when $2 \leq m \leq M-1$, an $m^{th}$-layer feature of the RGB Block is fused with all features of first m layers of the Lidar Block to obtain an $(m+1)^{th}$-layer feature $RGB\_L_E\_Feature_m$ of the RGB Block:

$$RGB\_L_E\_Feature_{m+1} = \sum_{k=1}^{m} T_{k,m} * Lidar\_L_E\_Feature_k + RGB\_L_E\_Feature_m$$

wherein, $Lidar\_L_E\_Feature_k$ represents a $k^{th}$-layer feature of the Lidar Block; $T_{k,m}$ represents a fusion parameter of the $k^{th}$-layer feature of the Lidar Block to the $m^{th}$-layer feature of the RGB Block; and $RGB\_L_E\_Feature_m$ represents the $m^{th}$-layer feature of the RGB Block; and an output of the fusion stage is $Lidar\_L_E\_Feature_M$ and $RGB\_L_E\_Feature_M$.

17. The storage medium according to claim 16, wherein a specific implementation process of the third fusion unit is as follows:

a first-layer feature in the point cloud Decoder stage is fused with a first-layer feature in the image Decoder stage:

$Lidar\_L_D\_Feature_2 = R_1 * RGB\_L_D\_Feature_1 + Lidar\_L_D\_Feature_1$ wherein, $Lidar\_L_D\_Feature_2$ represents a second-layer feature in the point cloud Decoder stage, $RGB\_L_D\_Feature_i$ represents the first-layer feature in the image Decoder stage, i.e. an image feature output by the second fusion unit; $Lidar\_L_D\_Feature_1$ represents the first-layer feature in the point cloud Decoder stage, i.e. a point cloud feature output by the second fusion unit; and $R_1$ represents a fusion parameter of the first-layer feature in the image Decoder stage to the first-layer feature in the point cloud Decoder stage;

the first-layer feature in the image Decoder stage is fused with the first-layer feature in the point cloud Decoder stage:

$RGB\_L_D\_Feature_2 = L_1 * Lidar\_L_D\_Feature_1 + RGB\_L_D\_Feature_1$ wherein, $RGB\_L_D\_Feature_2$ represents a second-layer feature in the image Decoder stage; and $L_1$ represents a fusion parameter of the first-layer feature in the point cloud Decoder stage to the first-layer feature in the image Decoder stage;

when $2 \leq i \leq N-1$, an $i^{th}$-layer feature in the point cloud Decoder stage is fused with an $i^{th}$-layer feature in the image Decoder stage:

$Lidar\_L_D\_Feature_{i+1} = R_1 * RGB\_L_D\_Feature_i + Lidar\_L_D\_Feature_i$ wherein, $Lidar\_L_D\_Feature_{i+1}$ represents an $(i+1)^{th}$-layer feature in the point cloud Decoder stage, $RGB\_L_D\_Feature_i$ represents the $i^{th}$-layer feature in the image Decoder stage, $Lidar\_L_D\_Feature_i$ represents the $i^{th}$-layer feature in the point cloud Decoder stage, and $R_1$ represents a fusion parameter of the $i^{th}$-layer feature in the image Decoder stage to the $i^{th}$-layer feature in the point cloud Decoder stage;

the $i^{th}$-layer feature in the image Decoder stage is fused with the $i^{th}$-layer feature in the point cloud Decoder stage:

$RGB\_L_D\_Feature_{i+1} = L_i * Lidar\_L_D\_Feature_i + RGB\_L_D\_Feature_i$ wherein, $RGB\_L_D\_Feature_{i+1}$ represents an $(i+1)^{th}$-layer feature in the image Decoder stage; and $L_1$ represents a fusion parameter of the $i^{th}$-layer feature in the point cloud Decoder stage to the $i^{th}$-layer feature in the image Decoder stage; and an output Output of the third fusion unit is:

$Output = L_N * Lidar\_L_D\_Feature_N + R_N * RGB\_L_D\_Feature_N$ wherein, $Lidar\_L_D\_Feature_N$ represents an $N^{th}$-layer feature in the point cloud Decoder stage, $RGB\_L_D\_feature_N$ represents an $N^{th}$-layer feature in the image Decoder stage, and $L_N$ and $R_N$ represent fusion parameters of the $N^{th}$ layer in the point cloud Decoder stage.

18. The storage medium according to claim 17, further comprising: establishing a training set, and training the semantic segmentation model to obtain fusion parameters therein, wherein values of the fusion parameters are all within [0, 1].

* * * * *